United States Patent
Herscovitch et al.

(10) Patent No.: US 9,141,091 B2
(45) Date of Patent: **\*Sep. 22, 2015**

(54) CLOUD SECURE CHANNEL ACCESS CONTROL

(71) Applicant: Identive Group, Inc., Santa Ana, CA (US)

(72) Inventors: Matthew Herscovitch, Fremont, CA (US); Jason Hart, Fremont, CA (US); Peter Lowe, Peyton, CO (US)

(73) Assignee: Identive Group, Inc., Santa Ana, CA (US)

( * ) Notice: Subject to any disclaimer, the term of this patent is extended or adjusted under 35 U.S.C. 154(b) by 87 days.

This patent is subject to a terminal disclaimer.

(21) Appl. No.: 13/747,155

(22) Filed: Jan. 22, 2013

(65) Prior Publication Data

US 2013/0222107 A1    Aug. 29, 2013

Related U.S. Application Data

(60) Provisional application No. 61/589,054, filed on Jan. 20, 2012.

(51) Int. Cl.
| | |
|---|---|
| *G05B 19/00* | (2006.01) |
| *H04Q 9/00* | (2006.01) |
| *G06K 5/00* | (2006.01) |
| *G06K 7/08* | (2006.01) |

(Continued)

(52) U.S. Cl.
CPC ............... *G05B 1/01* (2013.01); *G06K 7/0008* (2013.01); *H04L 63/0428* (2013.01); *H04L 63/0853* (2013.01); *G07C 9/00111* (2013.01); *G07F 7/0873* (2013.01)

(58) Field of Classification Search
CPC ......... G07F 7/0873; G07F 7/122; G07F 7/10; G07C 9/00111; H04L 63/0853; H04L 63/0428; G06K 7/0008
USPC ........... 340/5.6, 572.1, 540, 10.1, 505, 539.1; 235/451, 380, 492, 435, 449, 487; 709/207, 229, 204; 455/41.1, 557
See application file for complete search history.

(56) References Cited

U.S. PATENT DOCUMENTS

| | | |
|---|---|---|
| 7,726,566 B2 | 6/2010 | Brown et al. |
| 7,748,636 B2 | 7/2010 | Finn |

(Continued)

OTHER PUBLICATIONS

International Search Report and Written Opinion from co-pending International application No. PCT/US13/22560, dated Mar. 29, 2013, 13 pages.

*Primary Examiner* — Mirza Alam
(74) *Attorney, Agent, or Firm* — Proskauer Rose LLP

(57) ABSTRACT

Methods and systems are described herein for providing configuration and access control of a card reader using a secure channel between the card reader and a remote computing device. The card reader transmits a request for service to the remote computing device via a cloud-based communications network. The remote computing device receives the request for service via the cloud-based communications network and generates service instructions based on the received request for service. The remote computing device transmits the service instructions to the card reader via the cloud-based communications network. The card reader receives the service instructions from the remote computing device via the cloud-based communications network and configures operational settings based on the received service instructions.

28 Claims, 3 Drawing Sheets

(51) Int. Cl.
  G05B 1/01  (2006.01)
  G06K 7/00  (2006.01)
  H04L 29/06 (2006.01)
  *G07F 7/08*   (2006.01)
  *G07C 9/00*   (2006.01)

(56) References Cited

U.S. PATENT DOCUMENTS

| | | | |
|---|---|---|---|
| 7,814,018 | B1 | 10/2010 | Sosa et al. |
| 7,951,045 | B1 | 5/2011 | Brader |
| 8,086,269 | B2 | 12/2011 | Wang |
| 2006/0231623 | A1* | 10/2006 | Brown et al. .................. 235/451 |
| 2006/0280181 | A1* | 12/2006 | Brailas et al. .................. 370/392 |
| 2008/0014867 | A1* | 1/2008 | Finn .............................. 455/41.1 |
| 2008/0042830 | A1 | 2/2008 | Chakraborty et al. |
| 2008/0209571 | A1 | 8/2008 | Bhaskar et al. |
| 2009/0001160 | A1* | 1/2009 | Davis et al. .................... 235/380 |
| 2009/0095812 | A1* | 4/2009 | Brown et al. .................. 235/380 |
| 2011/0231541 | A1 | 9/2011 | Murthy et al. |
| 2011/0258333 | A1 | 10/2011 | Pomerantz et al. |
| 2011/0302264 | A1* | 12/2011 | Lawrence et al. ............. 709/207 |
| 2011/0307780 | A1 | 12/2011 | Harris et al. |
| 2012/0001730 | A1 | 1/2012 | Potyrailo et al. |
| 2012/0258777 | A1 | 10/2012 | Huang |

* cited by examiner

CLOUD SECURE CHANNEL ACCESS CONTROL

RELATED APPLICATIONS

This application claims priority to U.S. Provisional Patent Application No. 61/589,054, filed Jan. 20, 2012.

FIELD OF THE INVENTION

The subject matter of this application relates generally to methods and systems for providing configuration and access control of a card reader using a secure channel between the card reader and a cloud-based computing device.

BACKGROUND

Traditionally, card readers are associated with an access point to a system or building. In a physical access control system, card readers are commonly located at a door and each person who is authorized to enter the premises carries an access card that interacts with the readers. The access card can contain a radio-frequency identification (RFID) chip or an application-specific integrated circuit (ASIC) chip which stores a code number in its memory. The code number can be a single value or stored in multiple fields that correspond to, e.g., a serial number and a facility code to designate a building or series of buildings. The ASIC or RFID chip within the card is connected to an antenna, and the card is able to communicate to the reader using an inductive coupling, commonly referred to as RFID.

The reader typically sends out an interrogating signal at 125 KHz to 134 KHz, known as Low Frequency (LF). Other frequencies are also used; for example, another frequency band known as HF operates at the singular frequency of 13.56 Mhz. The card is presented to the reader (e.g., by being placed in proximity to the reader), and the reader reads a message from the card. The reader is programmed to strip the message of its overhead structure, and reformat the message in a standardized data stream which the reader sends to a control panel. For example, the standardized format can be the so-called Wiegand code. The control panel may or may not recognize the card as belonging to the population of authorized entrants. If the card is recognized as authorized, the panel takes appropriate action to open the door which generally involves setting a relay that sends an electric current to activate a device at the door (e.g., a magnetic strike or lock).

FIG. 1 is a block diagram of a system 100 comprising a card access control reader 103 connected to a control panel 101, as illustrated in the art. The reader 103 is connected to the control panel 101 via connection 102 (e.g., Wiegand interface). A card 104 is presented to the reader 103 (e.g., by passing the card in close proximity to the reader, or touching the card to the reader) using an RFID signal 105, and the reader 103 receives a message from the card 104.

Traditionally, card readers are programmed to be responsive to one type of card. Furthermore, the reader generally accepts a card only if the reader has been programmed to understand or acknowledge certain predetermined data formats coming from the card. Types of data formats include, but are not limited to, Frequency Shift Keying (FSK), Amplitude Modulation (AM) and Phase Shift Keying (PSK). The length of the messages can be different, ranging typically from 24 bits to 64 bits. The means by which the card indicates the beginning and end of a message also includes many different types, for example, Manchester encoding cessation or embedding of a string of ones or zeroes to mark the data field boundaries. Also, within the data fields once they are decoded, it is typical to have facility code and serial numbers in field lengths that are different for different situations.

The reader does not usually make the final decision as to whether a card is valid or not. If the card is of the correct format, the reader sends the now-decoded data stream via a message to a control panel which may be connected to a number of readers. The data stream is typically of the aforementioned Wiegand type, which is a self-clocking three wire protocol used in many access control systems, or utilizes serial communication with RS-232 or RS-485 based protocols. The control panel includes or is coupled to a database that consists of a list of authorized card numbers as well as facility codes. When the panel sees a card that is authorized, the panel operates a relay connected to one or more electro-mechanical devices on the door, such as a magnetic strike, and the door is allowed to open.

Although the card reader at the door is not typically responsible to make the final decision about the validity of a card, it is advantageous in certain circumstances for the reader to contain a list of disenrolled or invalid cards (also called a revocation list) or to check proper data integrity and formatting, so that the reader itself decides not to send to the control panel a code that was previously taken off the allowed list or is not properly read.

The reader is typically equipped with a light-emitting diode (LED) and a sounding device (e.g., a beeper). The LED and beeper devices can be programmed to behave in different ways depending on the reader's ultimate action.

During its life, a card reader may require maintenance such as:

Changing the data format of cards that should be acceptable to the reader;

Configuring the LED to light up or blink when a card is read, is accepted, or configuring the LED not to light up at all;

Configuring the beeper to beep when a card is read, is accepted, or configuring the beeper not to beep at all;

Running diagnostic routines such as: verifying that the power supplies are within limits, the tamper switch has not been disturbed, or other similar routines; and Loading a list of cards previously accepted but now invalid or disenrolled from the access control system.

Typically, card reader maintenance requires a technician to visit the location of the reader and perform certain manual tasks to the reader. Such maintenance increases the costs associated with the system and adds time to complete the maintenance process.

SUMMARY OF THE INVENTION

What is needed is a method and system to perform the card reader maintenance from a remote central facility at the request of the reader, instead of requiring a technician to be physically present at the reader during each maintenance. The techniques described herein provide a method and system that achieves the aforementioned objective of remote reader maintenance while also conducting such maintenance in a secure manner.

The invention, in one aspect, features a system for providing configuration and access control of a card reader using a secure channel between the card reader and a remote computing device. The system includes a card reader, a remote computing device, and a cloud-based communications network coupled to the card reader and the remote computing device. The card reader is configured to transmit a request for service to the remote computing device via the cloud-based communications network, receive service instructions from the remote computing device via the cloud-based communications network, and configure operational settings based on the received service instructions. The remote computing device is configured to receive the request for service from the card reader via the cloud-based communications network, generate service instructions responsive to the request for service, and transmit the service instructions to the card reader via the cloud-based communications network. The connection between the card reader and the remote computing device via the cloud-based communications network is encrypted.

The invention, in another aspect, features a computerized method for providing configuration and access control of a card reader using a secure channel between the card reader and a remote computing device. The card reader transmits a request for service to the remote computing device via a cloud-based communications network. The remote computing device receives the request for service via the cloud-based communications network and generates service instructions based on the received request for service. The remote computing device transmits the service instructions to the card reader via the cloud-based communications network. The card reader receives the service instructions from the remote computing device via the cloud-based communications network, and configures operational settings based on the received service instructions. The connection between the card reader and the remote computing device via the cloud-based communications network is encrypted.

In some embodiments, any of the above aspects can include one or more of the following features. In some embodiments, the system includes a control panel coupled to the card reader via a Wiegand interface. In some embodiments, the system includes a control panel coupled to the card reader via a serial, parallel, or networked communications interface. In some embodiments, the system includes a control panel coupled to the card reader via a serial, parallel, or networked communications interface through which the reader communicates to the cloud-based communications network and to the remote computing device. In some embodiments, the system includes a database coupled to the remote computing device, wherein the database contains information for use by the remote computing device in generating the service instructions. In some embodiments, the information includes active card numbers and inactive card numbers. In some embodiments, the card reader stores the active card numbers and inactive card numbers in a memory module coupled to the card reader.

In some embodiments, the information includes configuration instructions. In some embodiments, the system includes a secure authentication module (SAM) coupled to the card reader, wherein the SAM is configured to store one or more keys used to authenticate the card reader to the remote computing device. In some embodiments, the physical form of the SAM is a subscriber identity module (SIM) card. In some embodiments, the physical form of the SAM is a smart card. In some embodiments, the SAM is connected to the card reader via a physical interface. In some embodiments, the SAM is embedded within the card reader. In some embodiments, the card reader encrypts messages transmitted to the remote computing device using the keys stored in the SAM.

In some embodiments, the remote computing device is a virtual server existing on a shared web service. In some embodiments, the operational settings include activation of a beeper and activation of a light-emitting diode (LED).

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
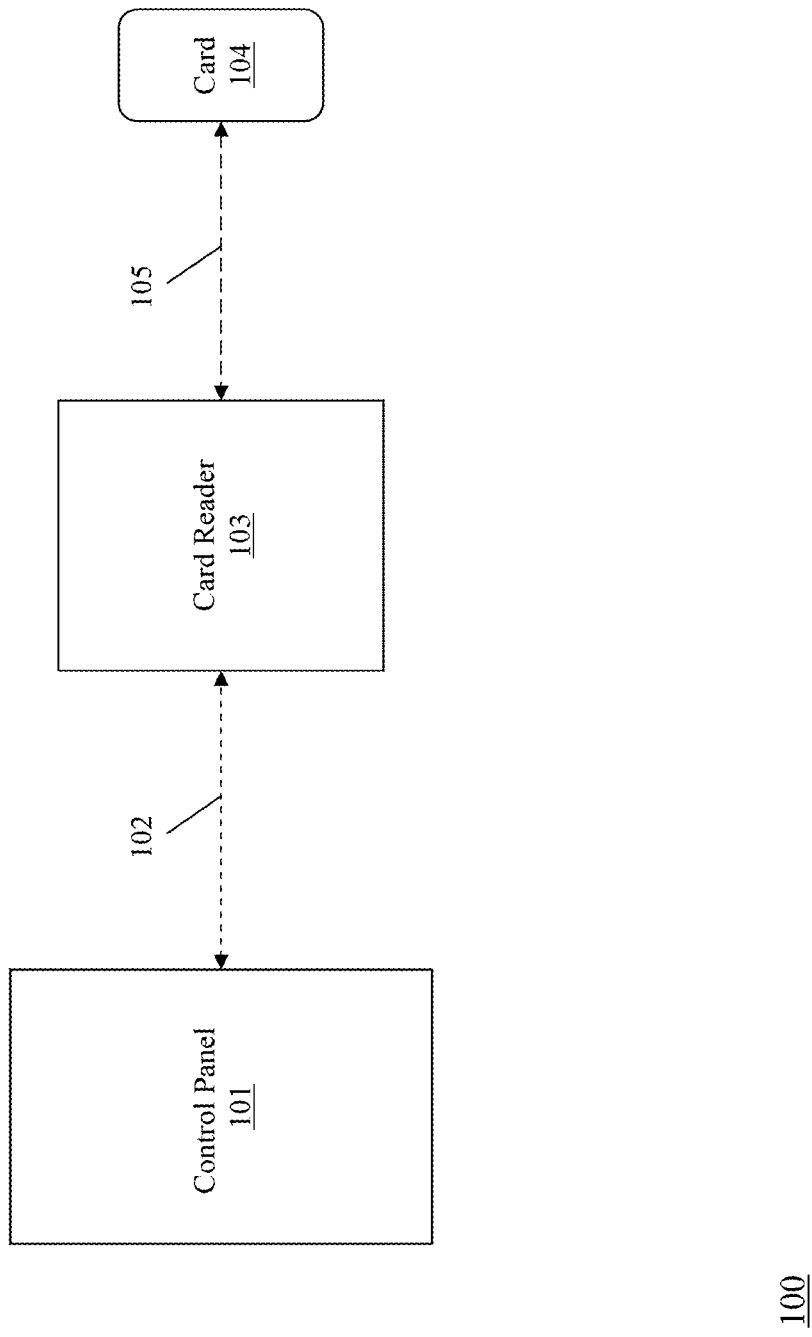
FIG. 1 is a block diagram of a system comprising a card access control reader connected to a control panel, as illustrated in the art.
Figure 2:
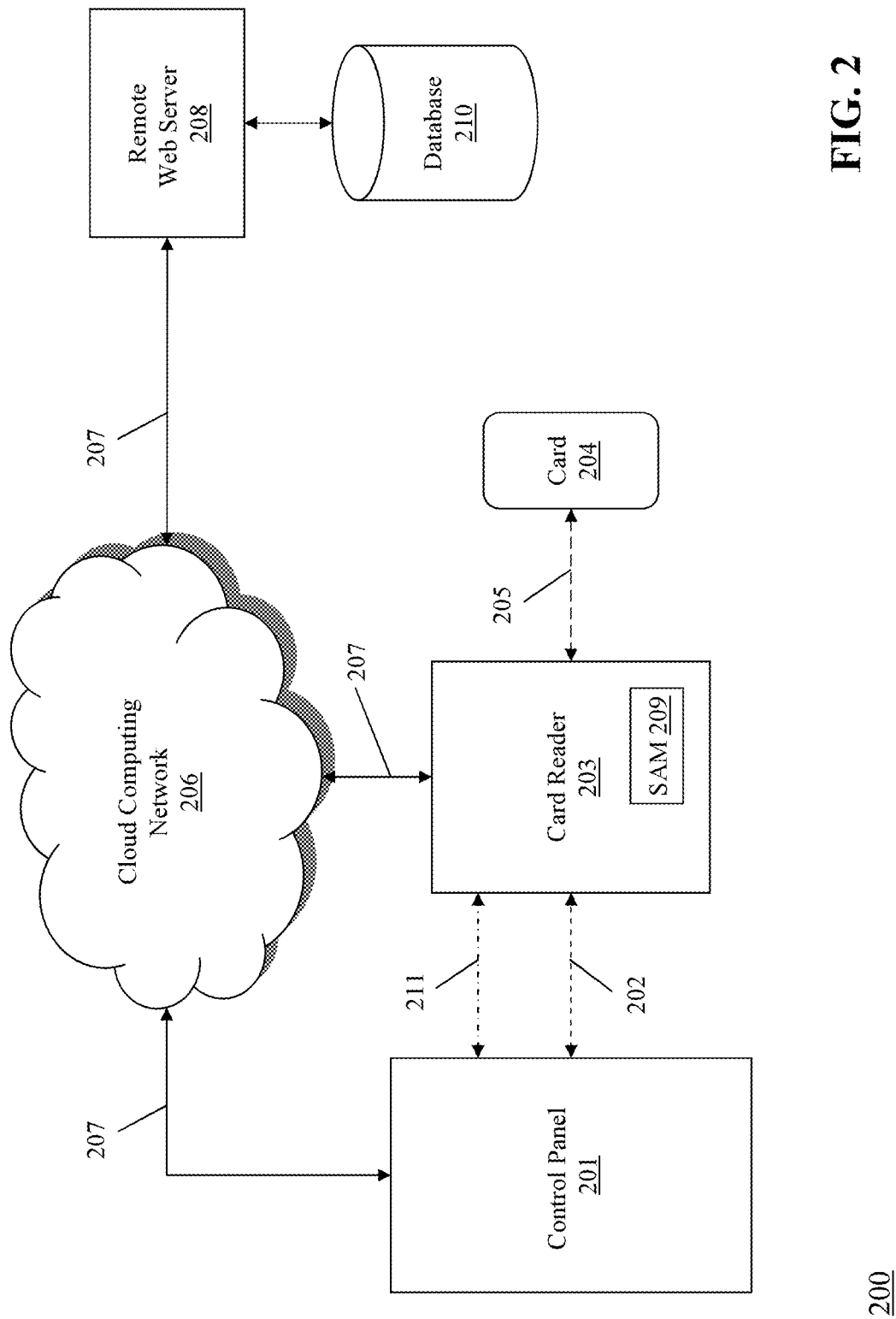
FIG. 2 is a block diagram of an access control system with a card reader that is maintained from a remote location via a cloud-based network, in accordance with embodiments of the present invention.

FIG. 2 is a block diagram of an access control system 200 with a card reader 203 that is maintained from a remote location via a cloud-based network 206, in accordance with embodiments of the present invention. The system in FIG. 2 includes a control panel 201 connected to a card reader 203 via a connection 202 (e.g., Wiegand interface). The system 200 also includes a card 204 (e.g., smart card) that is presented to the reader 203 using an RFID signal 205, and the reader 203 receives a message from the card 204.

The system 200 further includes an external communications network (e.g., cloud-based network 206) through which the card reader 203 is connected (207) to a remote computing device (e.g., remote web server 208). The web server 208 is programmed to respond to messages received from the reader 203 through the cloud-based connection 207. The messages sent by the reader 203 include requests for service and/or maintenance. The web server 208 includes or is coupled to a database 210 that contains configurations of the readers (e.g., reader 103) installed on the network. The web server 208 can be connected to other card readers (not shown in FIG. 2) using the same cloud-based network 206 or a separate communications network. In some embodiments, the system includes a control panel 201 coupled to the card reader 203 via a high speed communication interface 211. The high speed communication interface 211 is used to provide a secure channel between the card reader 203 and the remote computing device 208 through the control panel 201 via external communications network 207

In some embodiments, the scope of the reader's 203 requests for service or maintenance can be limited or broad. Messages sent between the remote web server 208 and the reader 203 are secured, e.g., through use of encryption techniques. The reader 203 includes a Secure Authentication Module (SAM) 209 that contains keys necessary to match keys located at the remote web server 208 in order to provide a secure link. The physical form of the SAM 209 can be similar to a subscriber identity module (SIM) card in a cell phone or a conventional contact smart card. In either case, the SAM 209 plugs into a slot or interface in the reader 203. In some embodiments, the SAM 209 can be permanently built into the reader 203.

Figure 3:
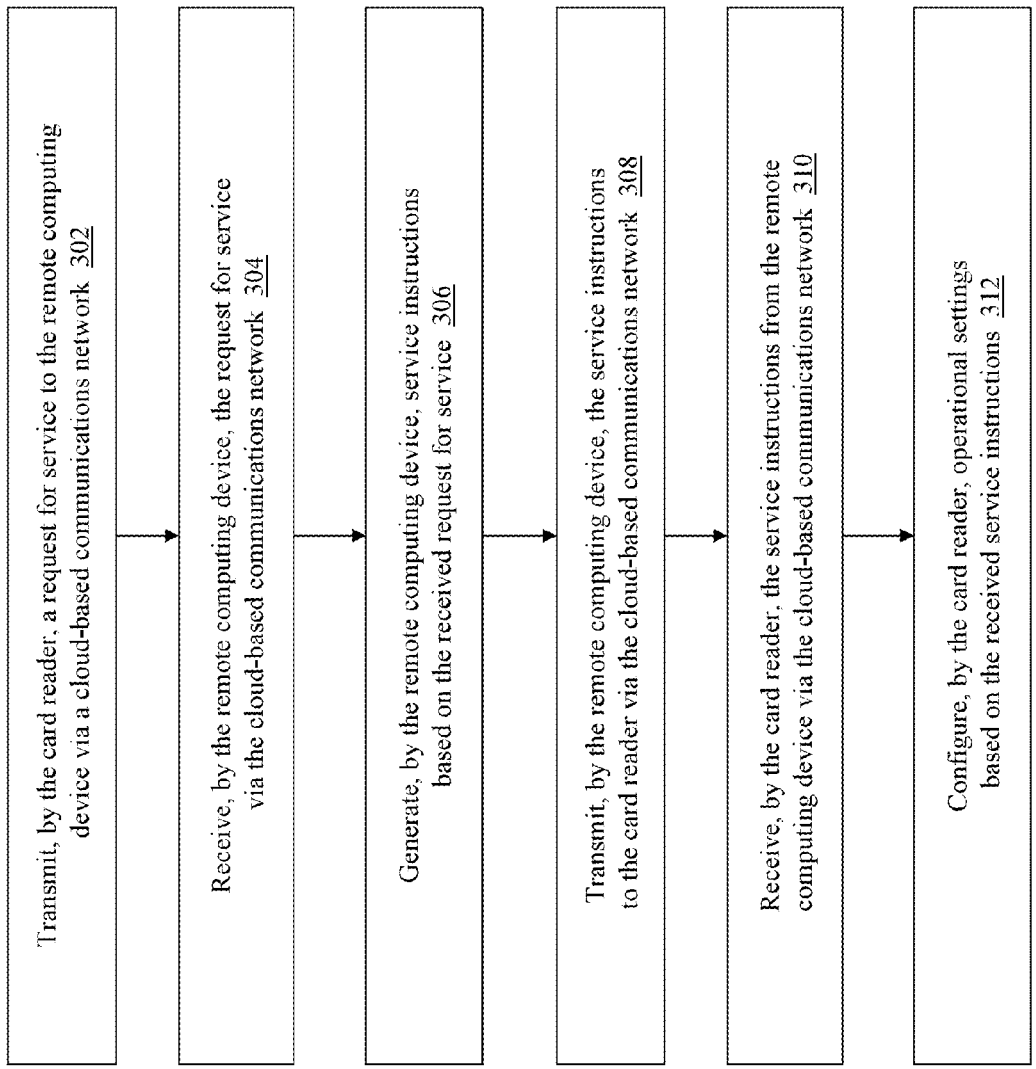
FIG. 3 is a flow diagram of a method for providing configuration and access control of a card reader using a secure channel between the card reader and a cloud-based computing device, according to the system of FIG. 2.

FIG. 3 is a flow diagram of a method 300 for providing configuration and access control of a card reader using a secure channel between the card reader and a cloud-based computing device, according to the system 200 of FIG. 2. The card reader 203 transmits (302) a request for service to the remote computing device 208 via the cloud-based communications network 206. The card reader 203 uses the cloud-based connection 207 to communicate with the remote computing device 208. The cloud-based connection 207 can be encrypted using any number of known encryption techniques. In addition, the card reader 203 can use keys stored in the SAM 209 as part of the communication to authenticate to the remote computing device 208. These techniques provide the advantage of maintaining a secure channel between the card reader and the remote computing device to prevent unauthorized interception of the communications.

The remote computing device 208 receives (304) the request for service via the cloud-based communications network 206. The remote computing device 208 generates (306) service instructions based on the received request for service. In some embodiments, the remote computing device 208 retrieves information from a database 210 that relates to the request for service. For example, if the card reader 203 requests an updated access card number list, the remote computing device 208 can retrieve a list of active and inactive cards from the database 210 and transmit the list as part of the service instructions. In another example, the card reader 203 may request an updated code file to resolve an internal error. The remote computing device 208 can retrieve the code file from the database 210 and transmit the file as part of the service instructions. The remote computing device 208 can be coupled to other data sources or other computing devices that provide services or information that the remote computing device 208 uses as part of the service instruction generation.

In addition, if the request for service includes authentication keys that the card reader 203 retrieved from SAM 209, the remote computing device 208 can compare the keys with information in the database 210 relating to authentication, in order to confirm the identity of the card reader 203 and the authenticity of the request for service.

Once the service instructions are generated, the remote computing device 208 transmits (308) the service instructions to the card reader 203 via the cloud-based communications network 206. The card reader 203 receives (310) the service instructions from the remote computing device 208 via the cloud-based communications network 206. The card reader 203 interprets the service instructions to determine a course of action (e.g., updating configuration settings, refreshing data stored in local memory).

Based on the service instructions, the card reader 203 configures (312) operational settings. For example, the instructions may instruct the card reader 203 to activate a beeper to sound, or a light-emitting diode (LED) to turn on, when a card 204 is read. In another example, the instructions may update a list of active and inactive card numbers stored locally at the card reader 203, so that the card reader 203 can stop activation signals from being sent to the control panel 201 and triggering the access mechanism when an inactive card is presented to the reader. In another example, the instructions may force the card reader 203 to reboot and install an updated software code file (e.g., a new software version).

In some embodiments, the request for service can be transmitted to the remote computing device 208 automatically upon startup of the card reader 203. In some embodiments, a real-time clock in the card reader 203 initiates a request for service and receipt of service instructions at periodic intervals (e.g., once a month).

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, and/or other communication protocols.

Devices of the computing system can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). Mobile computing device include, for example, a Blackberry®. IP phones include, for example, a Cisco® Unified IP Phone 7985G available from Cisco Systems, Inc, and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

The invention claimed is:

1. A computerized system for providing configuration and access control of a card reader using a secure channel between the card reader and a remote computing device, the system comprising:
    a card reader coupled to a secure authentication module (SAM) storing one or more keys;
    a remote computing device; and
    a cloud-based communications network coupled to the card reader and the remote computing device;
wherein the card reader is configured to:
    transmit a request for service to the remote computing device via the cloud-based communications network;
    receive service instructions from the remote computing device via the cloud-based communications network, wherein the service instructions comprise programmatic information to maintain operational performance of the card reader; and
    configure operational settings based on the received service instructions, comprising interpreting the service instructions and determining one or more changes to the operational settings based upon the service instructions;
wherein the remote computing device is configured to:
    receive the request for service from the card reader via the cloud-based communications network;
    generate service instructions responsive to the request for service, wherein the service instructions comprise programmatic information to maintain operational performance of the card reader; and
    transmit the service instructions to the card reader via the cloud-based communications network;
wherein the card reader communicates with the remote computing device via the cloud-based communications network with messages encrypted using the one or more keys of the SAM.

2. The system of claim 1, further comprising a control panel coupled to the card reader via a Wiegand interface.

3. The system of claim 1, further comprising a control panel coupled to the card reader via a serial, parallel, or networked communications interface.

4. The system of claim 1, further comprising a control panel coupled to the card reader via a serial, parallel, or networked communications interface through which the reader communicates to the cloud-based communications network and to the remote computing device.

5. The system of claim 1, further comprising a database coupled to the remote computing device, wherein the database contains information for use by the remote computing device in generating the service instructions.

6. The system of claim 5, wherein the service information includes instructions to update active card numbers and inactive card numbers used by the card reader.

7. The system of claim 6, wherein the card reader stores the active card numbers and inactive card numbers in a memory module coupled to the card reader.

8. The system of claim 1, wherein the service information includes an updated code file to resolve an internal error at the card reader.

9. The system of claim 1, wherein the physical form of the SAM is a subscriber identity module (SIM) card.

10. The system of claim 1, wherein the physical form of the SAM is a smart card.

11. The system of claim 1, wherein the SAM is coupled to the card reader via a physical interface.

12. The system of claim 1, wherein the SAM is embedded within the card reader.

13. The system of claim 1, wherein the remote computing device is a virtual server existing on a shared web service.

14. The system of claim 1, wherein the operational settings include activation of a beeper and activation of a light-emitting diode (LED).

15. A computerized method for providing configuration and access control of a card reader using a secure channel between the card reader and a remote computing device, the card reader being coupled to a secure authentication module (SAM) storing one or more keys, the method comprising:
   transmit, by the card reader, a request for service to the remote computing device via a cloud-based communications network;
   receive, by the remote computing device, the request for service via the cloud-based communications network;
   generate, by the remote computing device, service instructions based on the received request for service, wherein the service instructions comprise programmatic information to maintain operational performance of the card reader;
   transmit, by the remote computing device, the service instructions to the card reader via the cloud-based communications network;
   receive, by the card reader, the service instructions from the remote computing device via the cloud-based communications network; and
   configure, by the card reader, operational settings based on the received service instructions, comprising interpreting the service instructions and determining one or more changes to the operational settings based upon the service instructions;
   wherein the card reader communicates with the remote computing device via the cloud-based communications network with messages encrypted using the one or more keys of the SAM.

16. The method of claim 15, wherein the card reader is coupled to a control panel via a Wiegand interface.

17. The method of claim 15, wherein a control panel is coupled to the card reader via a serial, parallel, or networked communications interface.

18. The method of claim 15, wherein a control panel is coupled to the card reader via a serial, parallel, or networked communications interface through which the reader communicates to the cloud-based communications network and to the remote computing device.

19. The method of claim 15, wherein the remote computing device is coupled to a database containing information for use by the remote computing device in generating the service instructions.

20. The method of claim 19, wherein the service information includes instructions to update active card numbers and inactive card numbers used by the card reader.

21. The method of claim 20, wherein the card reader stores the active card numbers and inactive card numbers in a memory module coupled to the card reader.

22. The method of claim 15, wherein the service information includes an updated code file to resolve an internal error at the card reader.

23. The method of claim 15, wherein the physical form of the SAM is a subscriber identity module (SIM) card.

24. The method of claim 15, wherein the physical form of the SAM is a smart card.

25. The method of claim 15, wherein the SAM is coupled to the card reader via a physical interface.

26. The method of claim 15, wherein the SAM is embedded within the card reader.

27. The method of claim 15, wherein the remote computing device is a virtual server existing on a shared web service.

28. The method of claim 15, wherein the operational settings include activation of a beeper and activation of a light-emitting diode (LED).

* * * * *